Figure 1:
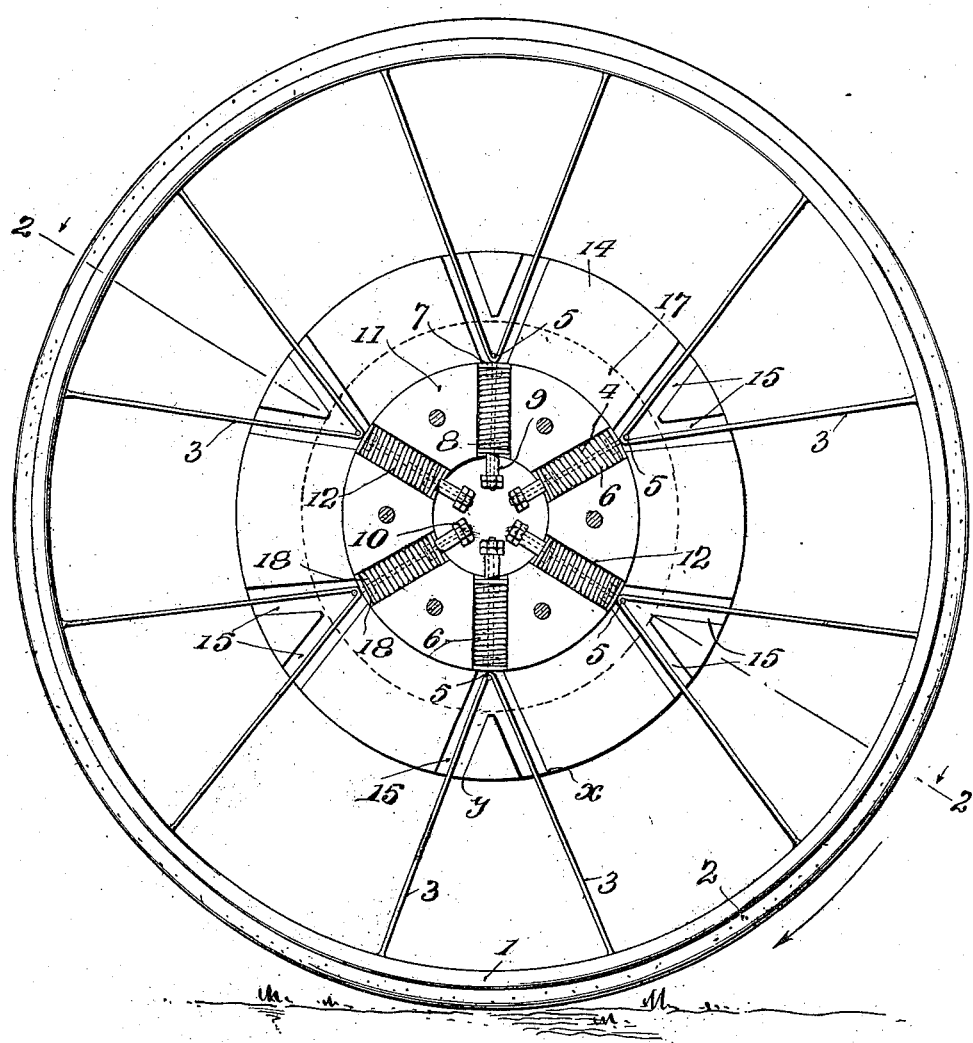

T. C. ERB.
SPRING WHEEL.
APPLICATION FILED OCT. 15, 1909.

984,894.

Patented Feb. 21, 1911.
2 SHEETS—SHEET 1.

Witnesses

Inventor
T. C. Erb
By
Attorneys

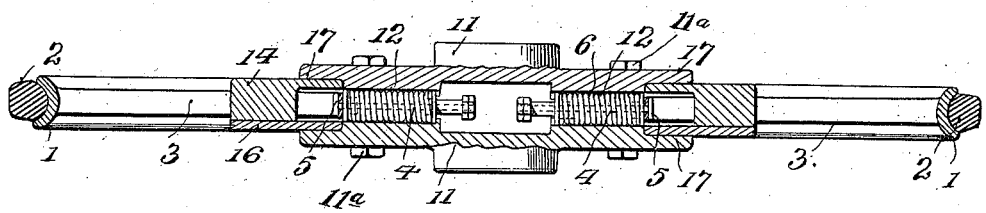
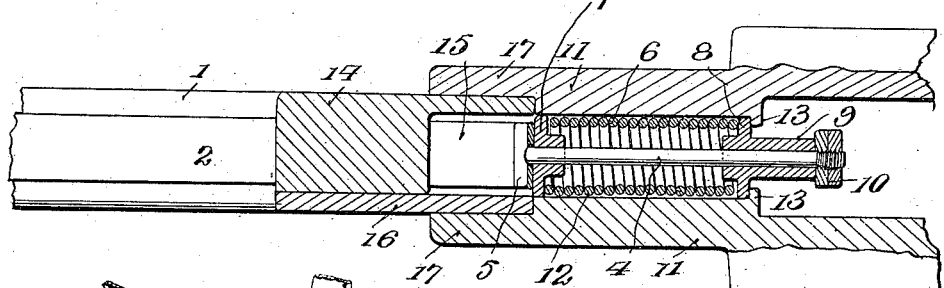
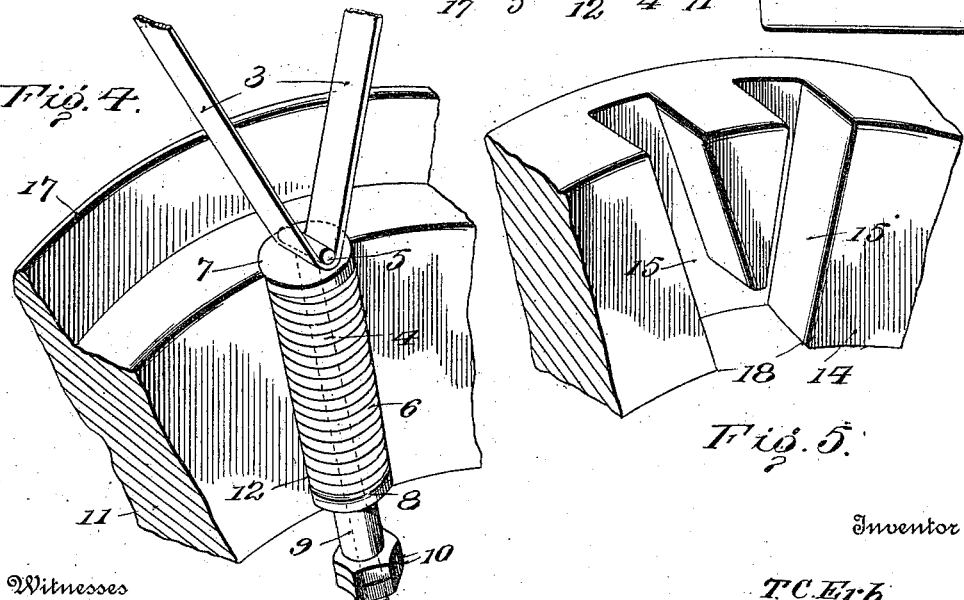

UNITED STATES PATENT OFFICE.

THEODORE C. ERB, OF HARRISBURG, PENNSYLVANIA, ASSIGNOR OF TWO-NINTHS TO WILLIAM M. BATES, OF HARRISBURG, PENNSYLVANIA, AND TWO-NINTHS TO JOHN P. NESTOR AND TWO-NINTHS TO JOHN REIFF, BOTH OF LYKENS, PENNSYLVANIA.

SPRING-WHEEL.

984,894.  Specification of Letters Patent.  Patented Feb. 21, 1911.

Application filed October 15, 1909. Serial No. 522,832.

*To all whom it may concern:*

Be it known that I, THEODORE C. ERB, a citizen of the United States, residing at Harrisburg, in the county of Dauphin and State of Pennsylvania, have invented certain new and useful Improvements in Spring-Wheels, of which the following is a specification.

This invention comprehends certain new and useful improvements in wheels for automobiles or other vehicles, and the primary object of the invention is an improved construction of wheel which will possess the characteristics of resiliency, durability and strength and avoid the use of a pneumatic tire, the resiliency being secured by an arrangement and combination of springs and other accessories located at the center or the hub portion of the wheel, the tire being of solid metal or solid rubber, as may be desired. And a further object of the invention is a simple and efficient construction of a resilient wheel, the parts of which may be cheaply manufactured and readily assembled and adjusted, and which will not be liable to get out of order.

With these and other objects in view, as will more fully appear as the description proceeds, the invention consists essentially in certain constructions, arrangements and combinations of the parts that I shall hereinafter fully describe and claim.

For a full understanding of the invention reference is to be had to the following description and accompanying drawings, in which:—

Figure 1 is a side elevation of a wheel constructed in accordance with my invention, part of the hub structure being omitted in order to better illustrate the interior parts. Fig. 2 is a diametrical section, the section being taken approximately on the line 2—2 of Fig. 1. Fig. 3 is a fragmental section on an enlarged scale. Fig. 4 is a fragmentary perspective view of a portion of the hub and two of the spokes, and Fig. 5 is a similar view of one of the rings which forms a part of the hub structure that will be hereinafter more specifically set forth.

Corresponding and like parts are referred to in the following description and indicated in all the views of the accompanying drawings by the same reference characters.

The rim of my improved wheel, designated 1, may be of any desired construction or type, and may be used either with or without a solid rubber tread member 2, as may be desired.

3 designates the spokes. These are preferably steel, and are of double formation. That is to say, in carrying out my invention, I double a steel bar of requisite strength and size, so that it will assume substantially a V-form, as best illustrated in Fig. 1, and secure the divergent ends of this bar to the felly or rim 1 in any desired way. Each spoke embodies two arms. At the apex of these arms, the spokes are formed with openings through which shanks 4 of T-bolts are passed, the transversely extending heads 5 of said bolts lying in the bend, as clearly illustrated in Fig. 4. These bolts 4 are encircled by helical springs 6, said springs bearing at one end upon cap washers 7, and at their other and inner ends against the flanged heads 8 of thimbles 9 that are mounted on the inner ends of the respective bolts. One or more nuts 10 are mounted upon the inner threaded ends of each bolt so as to adjust the degree of compression of the springs.

The hub of my improved wheel embodies corresponding side plates or disks 11 which are arranged to abut against each other face to face and which are formed with corresponding and registering semi-cylindrical and radially extending recesses 12, the pairs of recesses forming chambers in which the springs, bolts and parts 7 and 8 are received. The disks 11 are formed with coextensive central openings in which the thimbles 9 and nuts 10 are accommodated, so that the nuts may be easily reached for adjustment. At the inner ends of the chambers formed by the semi-cylindrical recesses 12 of the disks 11, the said disks are formed with inwardly extending shoulders 13 against which the flanged heads 8 of the thimbles 9 bear. In addition to the disks 11, the central portion or hub of the wheel embodies a ring 14 formed with pairs of side recesses 15 accommodating the inner ends of the spoke arms, as best illustrated in Fig. 1, and a substantially flat ring 16 which is complementary to the ring 14, and which is designed to close the sides of the recesses after the spokes have been received therein. These rings 14 and 16 are received in flanges 17 formed on the outer edges of the disks 11, and bolts 11ª, as indicated in Fig. 1 are then passed through the disks and rings so as to secure all of the parts firmly in place. The inner ends of the recesses 15 merge into each other, and at such point their opposing walls are a distance apart less than the diameter at the outer end of the chamber with which they register, thereby forming shoulders 18 against which the cap washers 7 abut, as best illustrated in Fig. 1.

From the foregoing description in connection with the accompanying drawings, the operation and advantages of my improved wheel will be apparent. In the practical use of the wheel, after the parts have been assembled, and the springs adjusted to the desired tension, it is obvious that any upward stress or impact upon the tread portion of the wheel, or surface, will be imparted to the springs by the spokes 3, the cap washers 7 that are lowermost pushing upwardly upon their springs, and the spokes which are uppermost pulling upwardly upon their bolts, the springs 6 being thereby contracted in both instances and receiving and absorbing the shock or pressure, the wheel thereby possessing the characteristic of resiliency to a marked degree, while at the same time, as will be evident, not being open to the objectionable incidents that are common to wheels which depend for their resiliency upon pneumatic tires that are so liable to become punctured or otherwise injured and rendered useless until repaired.

It will of course be understood that the arms of the spokes 3 will bear against corresponding walls of the recesses 15 when the wheel turns in one direction or the reverse, the spokes having a limited pivoted movement independently of the hub portion of the wheel. For example, if the wheel is turning in the direction of the dart or arrow in Fig. 1, the arms of the spokes will bear against the shoulders formed by the walls $x$ and $y$ of the several recesses 15.

While the spokes 3 have a limited movement in a plane coincident with the said plane of rotation, they are held absolutely from moving in a sidewise direction and the wheel is effectually braced so that it will not give or twist sidewise in going around corners or the like. This bracing action is effected primarily by the rings 14 and 16, it being understood that after the spokes have been received in the recesses 15, and the ring 16 applied to close the side of the recess, the spokes will be absolutely prevented from any side play, the depth of the recess being approximately equal to the width of the spoke.

Having thus described the invention what is claimed as new is:—

A resilient wheel, embodying a rim, spokes, connected at their outer ends to the rim, a hub formed with radially extending chambers, contractile springs mounted in said chambers, bolts secured to the inner ends of the respective spokes, the bolts passing through the springs, cap washers mounted on said bolts and bearing against the outer ends of the springs, thimbles secured to the inner ends of the bolts and bearing against the inner ends of the springs, the hub being formed at the inner ends of the chambers with shoulders against which the thimbles bear to limit the inward movement of the thimbles, and a ring also included in the hub of the wheel and surrounding the chambers and formed with recesses accommodating the spokes, the inner ends of said recesses being of less diameter than the outer ends of the chambers, and constituting shoulders against which the cap washers will bear to limit the outward movement of the cap washers.

In testimony whereof I affix my signature in presence of two witnesses.

THEODORE C. ERB. [L. S.]

Witnesses:
W. N. WOODSON,
FREDERICK S. STITT.